United States Patent
Singh

(10) Patent No.: US 12,346,857 B2
(45) Date of Patent: Jul. 1, 2025

(54) INTELLIGENT SYSTEM FOR MINTING DIGITAL ASSETS WITH POWER CONSUMPTION OPTIMIZATION

(71) Applicant: BANK OF AMERICA CORPORATION, Charlotte, NC (US)

(72) Inventor: Shailendra Singh, Maharashtra (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 170 days.

(21) Appl. No.: 18/224,808

(22) Filed: Jul. 21, 2023

(65) Prior Publication Data

US 2025/0029034 A1    Jan. 23, 2025

(51) Int. Cl.
G06F 1/32         (2019.01)
G06F 1/3203       (2019.01)
G06Q 10/0631      (2023.01)

(52) U.S. Cl.
CPC ..... *G06Q 10/06313* (2013.01); *G06F 1/3203* (2013.01)

(58) Field of Classification Search
CPC .................. G06Q 10/06313; G06F 1/3203
See application file for complete search history.

(56) References Cited

U.S. PATENT DOCUMENTS

| | | |
|---|---|---|
| 11,720,913 B2 | 8/2023 | Augustine et al. |
| 11,743,137 B2 | 8/2023 | Padmanabhan |
| 11,770,256 B1 * | 9/2023 | Carlson ................. H04L 9/3236 |
| 2021/0182806 A1 | 6/2021 | Ornelas et al. |
| 2022/0222246 A1 | 7/2022 | Rich et al. |
| 2022/0337439 A1 | 10/2022 | Mccoy |
| 2023/0034621 A1 | 2/2023 | Pardo |
| 2023/0114235 A1 | 4/2023 | Eivy et al. |
| 2023/0137867 A1 * | 5/2023 | Walters ................. H04L 9/3297 705/75 |
| 2023/0176639 A1 * | 6/2023 | Ma .......................... G06F 1/266 713/340 |
| 2023/0188349 A1 | 6/2023 | Moy et al. |
| 2023/0237468 A1 | 7/2023 | Fletcher et al. |
| 2023/0245103 A1 * | 8/2023 | Lacavera ................. H04L 9/14 705/66 |
| 2023/0289778 A1 * | 9/2023 | Sponable ............. G06Q 20/389 |
| 2023/0325814 A1 | 10/2023 | Vijayan et al. |
| 2023/0327457 A1 | 10/2023 | Cella et al. |
| 2024/0303734 A1 * | 9/2024 | Patt ....................... G06F 16/951 |
| 2024/0311910 A1 * | 9/2024 | van Schouwen .... G06Q 20/389 |

* cited by examiner

*Primary Examiner* — Zahid Choudhury
(74) *Attorney, Agent, or Firm* — Moore & Van Allen PLLC; Anup Iyer

(57) ABSTRACT

Intelligent and dynamic power consumption optimization during minting of a digital asset, such as an NFT or the like. Metadata is extracted from a digital file and the extracted metadata is applied to Machine Learning (ML) models, such as Deep Learning (DL) models to determine an optimal power consumption scheme for minting the digital asset from the digital file. In response to determining the optimal power consumption, the digital asset is minted using the optimal power consumption scheme. The optimal power consumption scheme may define (i) a distributed trust computing network for minting the digital asset, including the geographic location of the distributed trust computing network, (ii) a minting algorithm used to mint the digital asset, (iii) a consensus algorithm for validating minting of the digital asset, and (iv) a storage location for the digital file once the digital asset has been minted.

20 Claims, 10 Drawing Sheets

INTELLIGENT SYSTEM FOR MINTING DIGITAL ASSETS WITH POWER CONSUMPTION OPTIMIZATION

FIELD OF THE INVENTION

The present invention is related generally to digital assets and, more specifically, systems and methods for intelligently and dynamically optimizing power consumption during the minting/mining of a digital asset.

BACKGROUND

Digital assets, such Non-Fungible Tokens (NFTs) and cryptocurrencies are generated via energy intensive minting and/or mining operations. For example, the minting of NFTs or mining of cryptocurrency may involve a highly energy intensive Proof-of-Work (PoW) consensus mechanism used in distributed trust computing networks to achieve consensus and validate the minting or mining operation. In a PoW system, miners compete to solve a complex mathematical puzzle, known as a "hash puzzle," in order to add a new block to a distributed ledger. However, the puzzle requires significant computational power and energy consumption to solve. The energy consumption required for mining/minting has raised environmental concerns, especially as the popularity and scale of digital assets have grown. Other factors, beside the consensus mechanism also play in part in defining the overall power consumption (commonly referred to as "carbon footprint") required to mint or mine a digital asset. Such other factors may include, but are not limited to, the distributed trust computing network and the type of computing resources within the distributed trust computing network used to mint/mine the digital asset Moreover, the geographic location of the distributed trust computing network may impact the overall power consumption/carbon imprint, in that, the geographic location (e.g., country or region) may define what types of regulations and rules are in place to limit power consumption or may define what type of power is used to mint/mine digital assets (e.g., coal (i.e., high carbon emissions) vs wind turbine (i.e., minimal carbon emissions) and the like).

Therefore, a need exists to develop systems, methods, computer program products that intelligently and dynamically optimize power consumption during the minting of a digital asset, such as an NFT or the like. In this regard, the optimization process should serve to limit the amount of power consumed when minting a digital asset.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by intelligently and, in some embodiments, dynamically optimize power consumption during minting of a digital asset, such as an NFT or the like. Metadata is extracted from a digital file and the extracted metadata is applied to Machine Learning (ML) models, such as Deep Learning (DL) models to determine an optimal power consumption scheme for minting the digital asset from the digital file. In response to determining the optimal power consumption, the digital asset is minted using the optimal power consumption scheme.

In specific embodiments of the invention, the optimal power consumption scheme will identify (i) a distributed trust computing network for minting the digital asset (including the geographic location of the distributed trust computing network), (ii) a minting algorithm used to mint the digital asset, (iii) a consensus algorithm for validating minting of the digital asset, and (iv) a storage location for the digital file once the digital asset has been minted. In further specific embodiments of the invention, real-time network performance parameters are received from various different distributed trust computing networks and applied to the ML models for determining which distributed trust computing network to include in the optimal power consumption scheme.

In further specific embodiments of the invention, once minted, certification rules are selected based on digital asset type and the optimal power consumption scheme (and/or results of the optimal power consumption scheme (i.e., the power consumed)) are applied to the selected certification rules to determine a certification status for the digital asset. The certification status indicates a level of power consumption used to mint the digital asset. In further related embodiments of the system, a set of ingestion validation rules, such as a smart contract is generated based on the certification status and the validation rules are executed to receive and validate the digital asset into a digit asset exchange platform.

A system for intelligently determining and implementing power optimization consumption for minting digital assets defines first embodiments of the invention. The system includes a first computing platform having a first memory and one or more first computing processor devices in communication with the first memory. The first memory stores a digital file metadata extractor that is executable by at least one of the one or more first computing processor devices and configured to extract metadata from a digital file. The first memory additionally stores a digital asset power consumption optimization engine including one or more first machine learning models. The engine is executable by at least one of the one or more first computing processor devices and configured to apply, at least, the extracted metadata to the one or more first machine learning models to determine an optimal power consumption scheme for minting a digital asset of the digital file.

The system additionally includes a second computing platform having a second memory and one or more second computing processor devices in communication with the second memory. The second memory stores a digital asset minting application that is executable by at least one of the one or more second computing processor devices and configured to receive the digital file and mint a digital asset of the digital file according to the optimal power consumption scheme.

In specific embodiments of the system, the digital asset power consumption optimization engine is further configured to apply, at least, the extracted metadata to the one or more machine learning models to determine an optimal power consumption scheme including, at least one of (i) a distributed trust computing network for minting the digital asset, (ii) a minting algorithm used to mint the digital asset, (iii) a consensus algorithm for validating minting of the digital asset.

In further specific embodiments of the system, the digital asset power consumption optimization engine is further configured to receive real-time network performance parameters from a plurality of distributed trust computing networks and further apply the real-time network performance parameters to the one or more machine learning models to determine the optimal power consumption scheme including the distributed trust computing network for minting the digital asset from amongst the plurality of distributed trust computing networks.

In other specific embodiments of the system, the digital asset power consumption optimization engine is further configured to apply, at least, the extracted metadata to the one or more machine learning models to determine an optimal power consumption scheme including a geographic location for minting the digital asset and/or a storage location for the digital file after minting the digital asset.

In additional specific embodiments the system includes a third computing platform having a third memory and one or more third computing processor devices in communication with the third memory. The third memory stores a certification rules engine including a plurality of certification rules, executable by at least one of the one or more second computing processor devices and configured to select one or more of the plurality certification rules based at least on a type of the digital asset, and apply at least the optimal power consumption scheme to the selected one or more certification rules to determine a certification status for the digital asset. The certification status indicates a level of power consumption used to mint the digital asset. In related embodiments of the system, the certification rules engine is further configured to in response to determining the certification status, generate a set of ingestion validate rules. In further related embodiments of the system, the third memory further stores a digital asset ingestion module that is executable by at least one of the one or more second computing processor devices and configured to execute the set of ingestion rules to receive and validate the digital asset into a digit asset exchange platform. In other related embodiments of the system, the digital asset ingestion module is further configured to, in response to ingesting the digital asset into a digit asset exchange platform, classify the digital asset based on the certification status and assign an index tag based on the classification.

A computer-implemented method for intelligently determining and implementing power optimization consumption for minting digital assets defines second embodiments of the invention. The method is executable by one or more computing device processors and includes extracting metadata from a digital file and applying, at least, the extracted metadata to the one or more first machine learning models to determine an optimal power consumption scheme for minting a digital asset of the digital file. The computer-implemented method further includes minting a digital asset of the digital file according to the optimal power consumption scheme.

In specific embodiments of the computer-implemented method, applying further includes applying, at least, the extracted metadata to the one or more first machine learning models to determine the optimal power consumption scheme including at least one of (i) a distributed trust computing network for minting the digital asset, (ii) a minting algorithm used to mint the digital asset, (iii) a consensus algorithm for validating minting of the digital asset.

In other specific embodiments the computer-implemented method further includes receiving real-time network performance parameters from a plurality of distributed trust computing networks. In such embodiments of the computer-implemented method, applying further includes applying the real-time network performance parameters to the one or more machine learning models to determine the optimal power consumption scheme including the distributed trust computing network for minting the digital asset from amongst the plurality of distributed trust computing networks.

In still further specific embodiments of the computer-implemented method, applying further includes applying, at least, the extracted metadata to the one or more first machine learning models to determine the optimal power consumption scheme including at least one of (i) a geographic location for minting the digital asset and (ii) a storage location for the digital file after minting the digital asset.

Moreover, in other specific embodiments the computer-implemented method further includes selecting one or more of the plurality certification rules based at least on a type of the digital asset and applying at least the optimal power consumption scheme to the selected one or more certification rules to determine a certification status for the digital asset. The certification status indicates a level of power consumption used to mint the digital asset. In related embodiments the computer-implemented method further includes in response to determining the certification status, generating a set of ingestion validate rules and executing the set of ingestion rules to receive and validate the digital asset into a digit asset exchange platform.

A computer program product including a non-transitory computer-readable medium defines third embodiments of the invention. The computer-readable medium includes sets of codes for causing one or more computing devices to (i) extract metadata from a digital file, (ii) apply, at least, the extracted metadata to the one or more first machine learning models to determine an optimal power consumption scheme for minting a digital asset of the digital file, and (iii) mint a digital asset of the digital file according to the optimal power consumption scheme.

In specific embodiments of the computer program product, the set of codes for causing the one or more computing devices to apply are further configured to cause the one or more computing devices to apply, at least, the extracted metadata to the one or more first machine learning models to determine the optimal power consumption scheme including at least one of (i) a distributed trust computing network for minting the digital asset, (ii) a minting algorithm used to mint the digital asset, (iii) a consensus algorithm for validating minting of the digital asset.

In other specific embodiments of the computer program product, the set of codes further include a set of codes for causing the one or more computing devices to receive real-time network performance parameters from a plurality of distributed trust computing networks. In such embodiments of the computer program product, the set of codes for causing the one or more computing devices to apply are further configured to cause the one or more computing devices to apply the real-time network performance parameters to the one or more machine learning models to determine the optimal power consumption scheme including the distributed trust computing network for minting the digital asset from amongst the plurality of distributed trust computing networks.

Moreover, in additional specific embodiments of the computer program product, the set of codes for causing the one or more computing devices to apply are further configured to cause the one or more computing devices to apply, at least, the extracted metadata to the one or more first machine learning models to determine the optimal power consumption scheme including at least one of (i) a geographic location for minting the digital asset and (ii) a storage location for the digital file after minting the digital asset.

In additional specific embodiments of the computer program product, the sets of codes further include sets of codes for causing the one or more computing devices to (i)
select one or more of the plurality certification rules based at least on a type of the digital asset, and (ii) apply at least the optimal power consumption scheme to the selected one or more certification rules to determine a certification status for the digital asset. The certification status indicates a level of power consumption used to mint the digital asset.

Thus, according to embodiments of the invention, which will be discussed in greater detail below, the present invention provides for intelligently and, in some embodiments, dynamically optimizing power consumption during minting of a digital asset, such as an NFT or the like. Metadata is extracted from a digital file and the extracted metadata is applied to Machine Learning (ML) models, such as Deep Learning (DL) models to determine an optimal power consumption scheme for minting the digital asset from the digital file. In response to determining the optimal power consumption, the digital asset is minted using the optimal power consumption scheme. As a result of the present invention, the digital asset is minted using optimal power consumption to minimize the digital assets carbon footprint.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
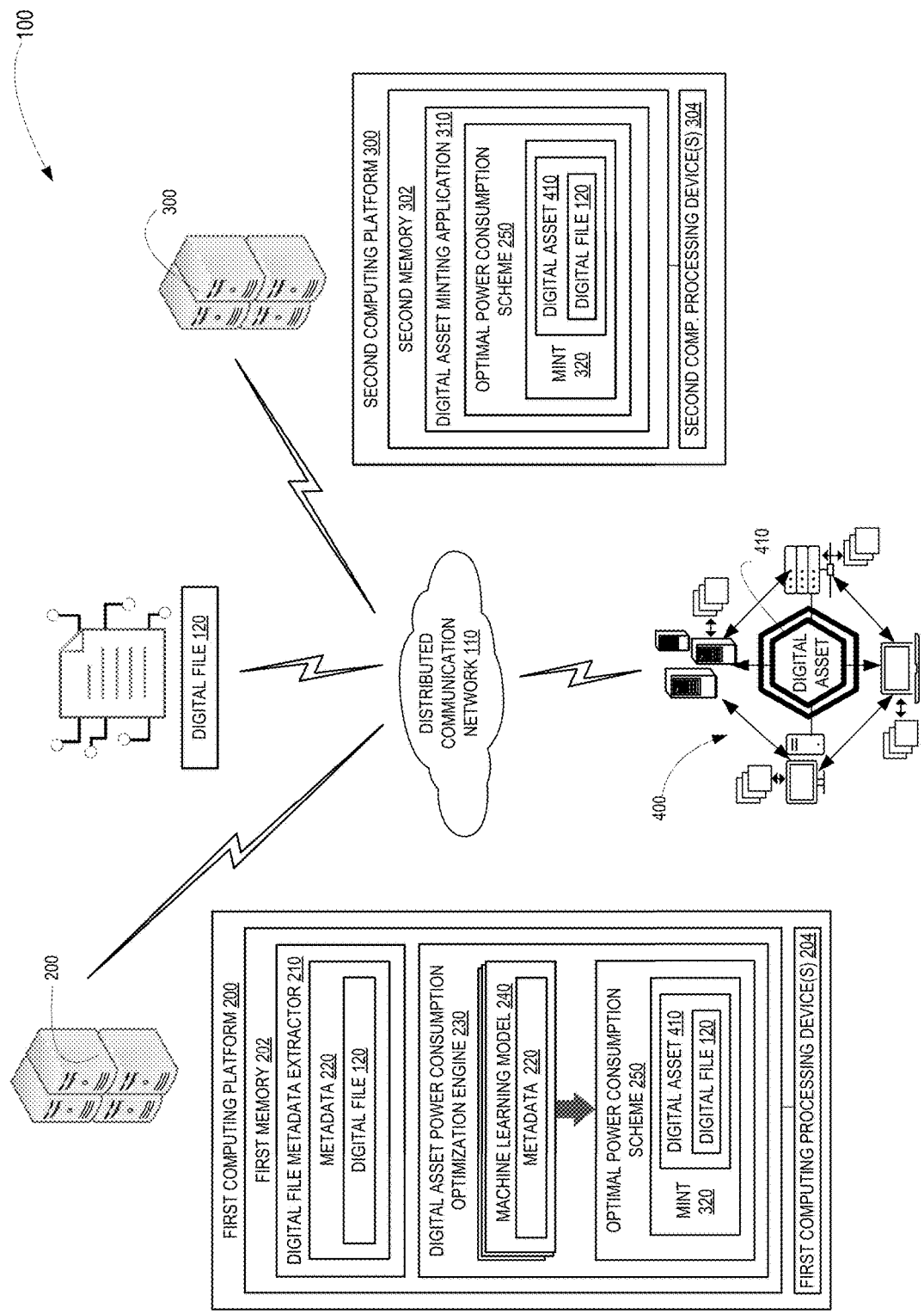
Figure 2:
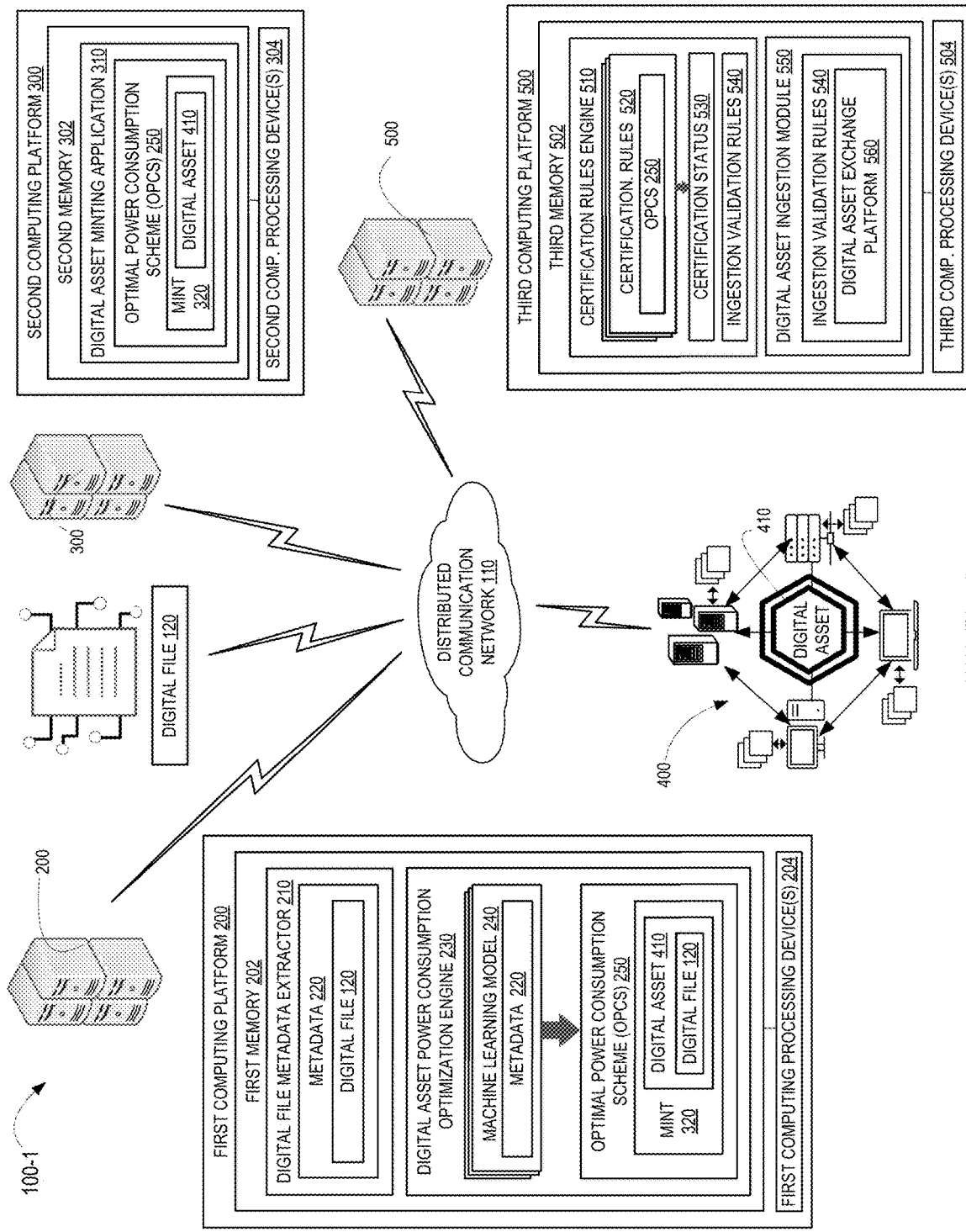
Figure 3:
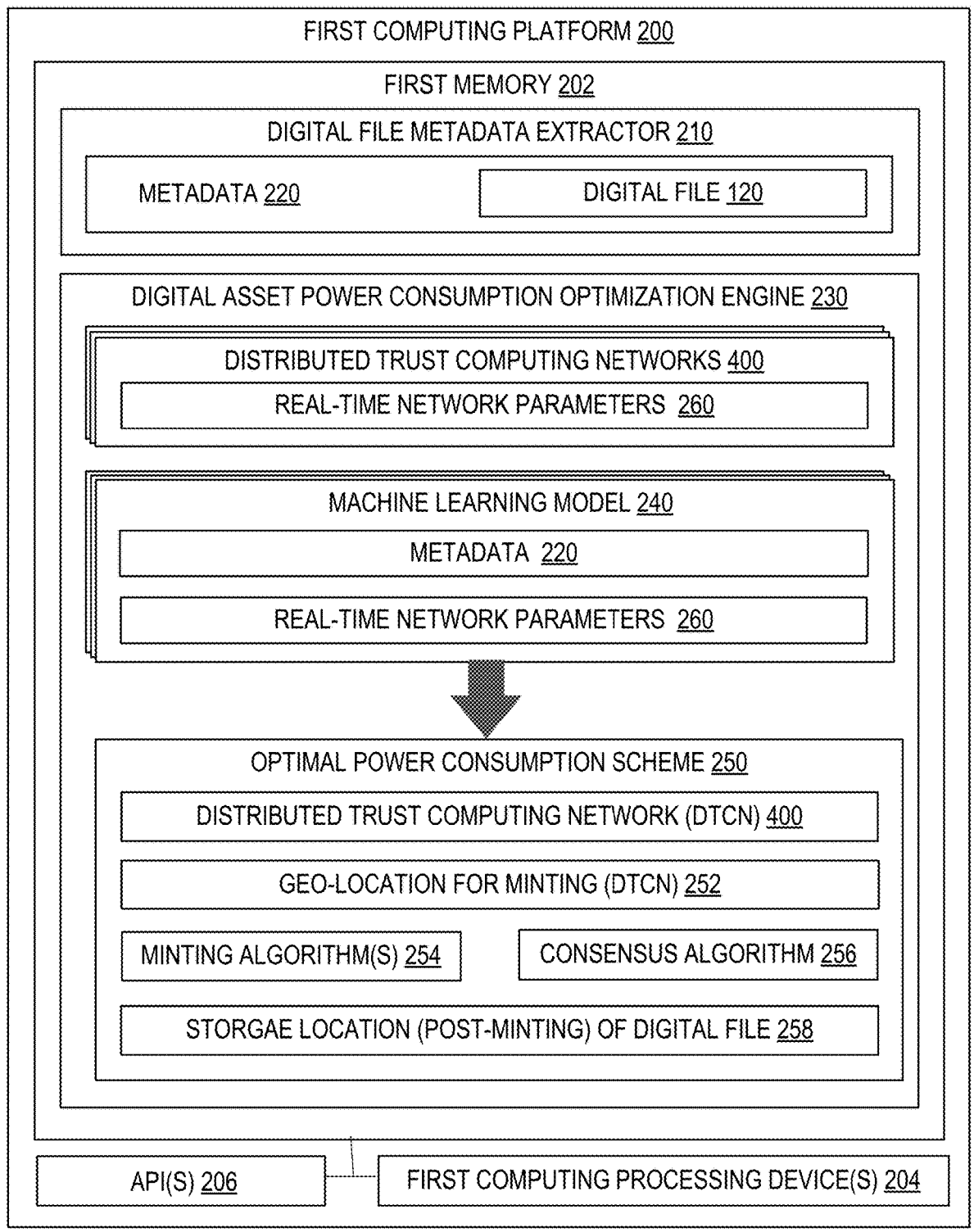
Figure 4:
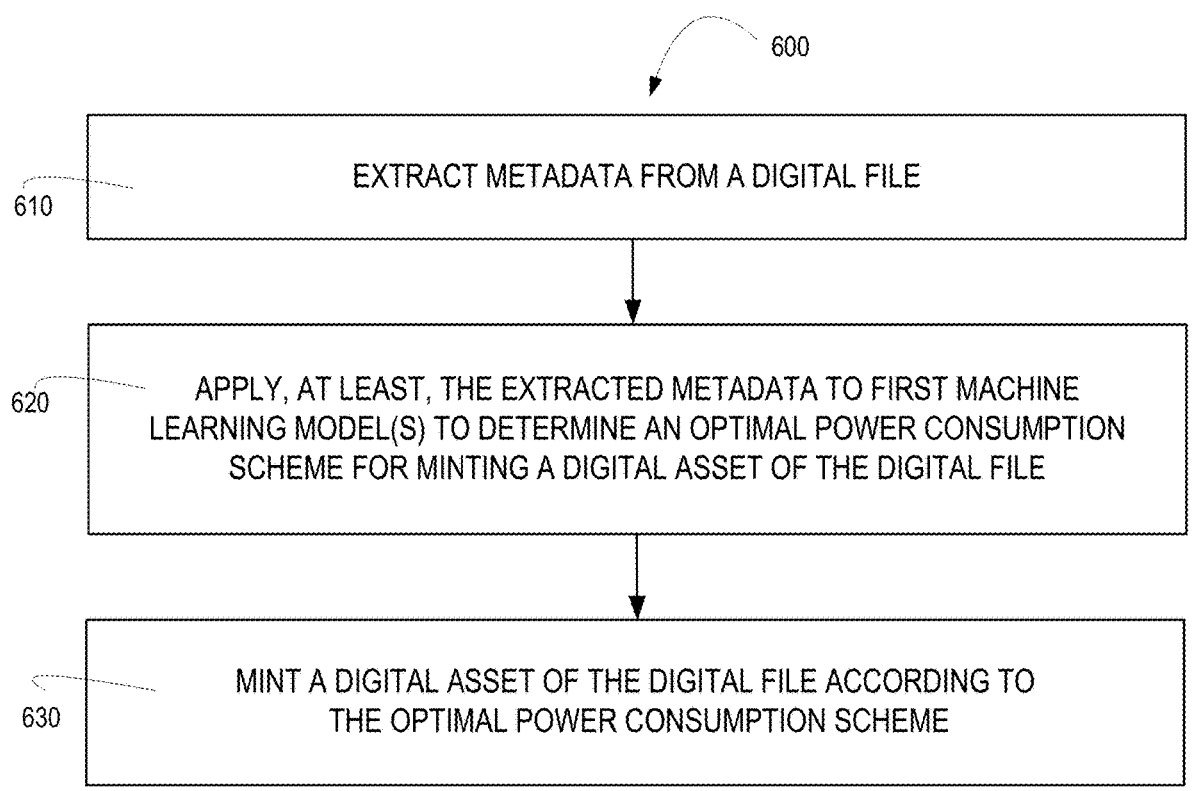
Figure 5:
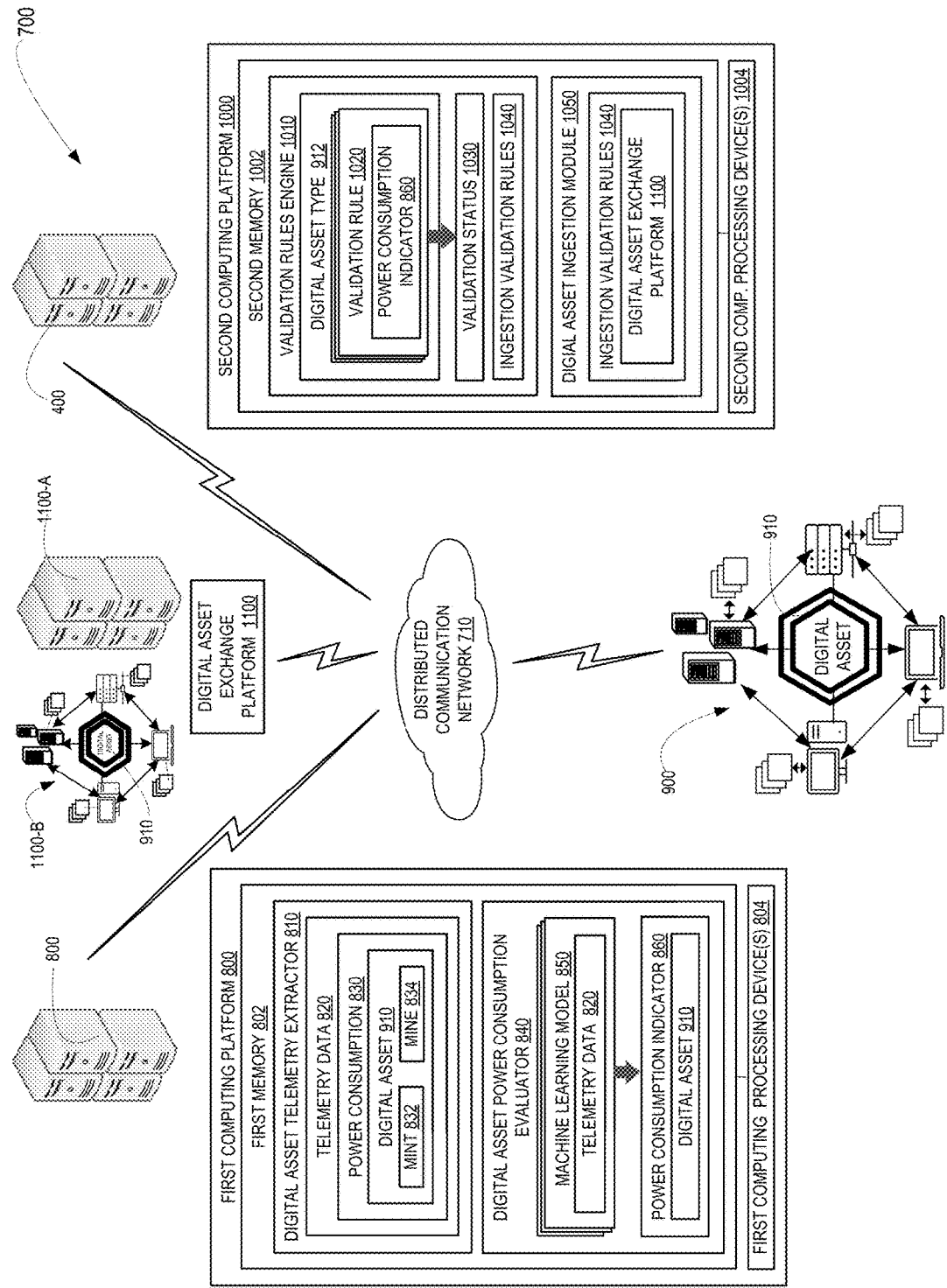
Figure 6:
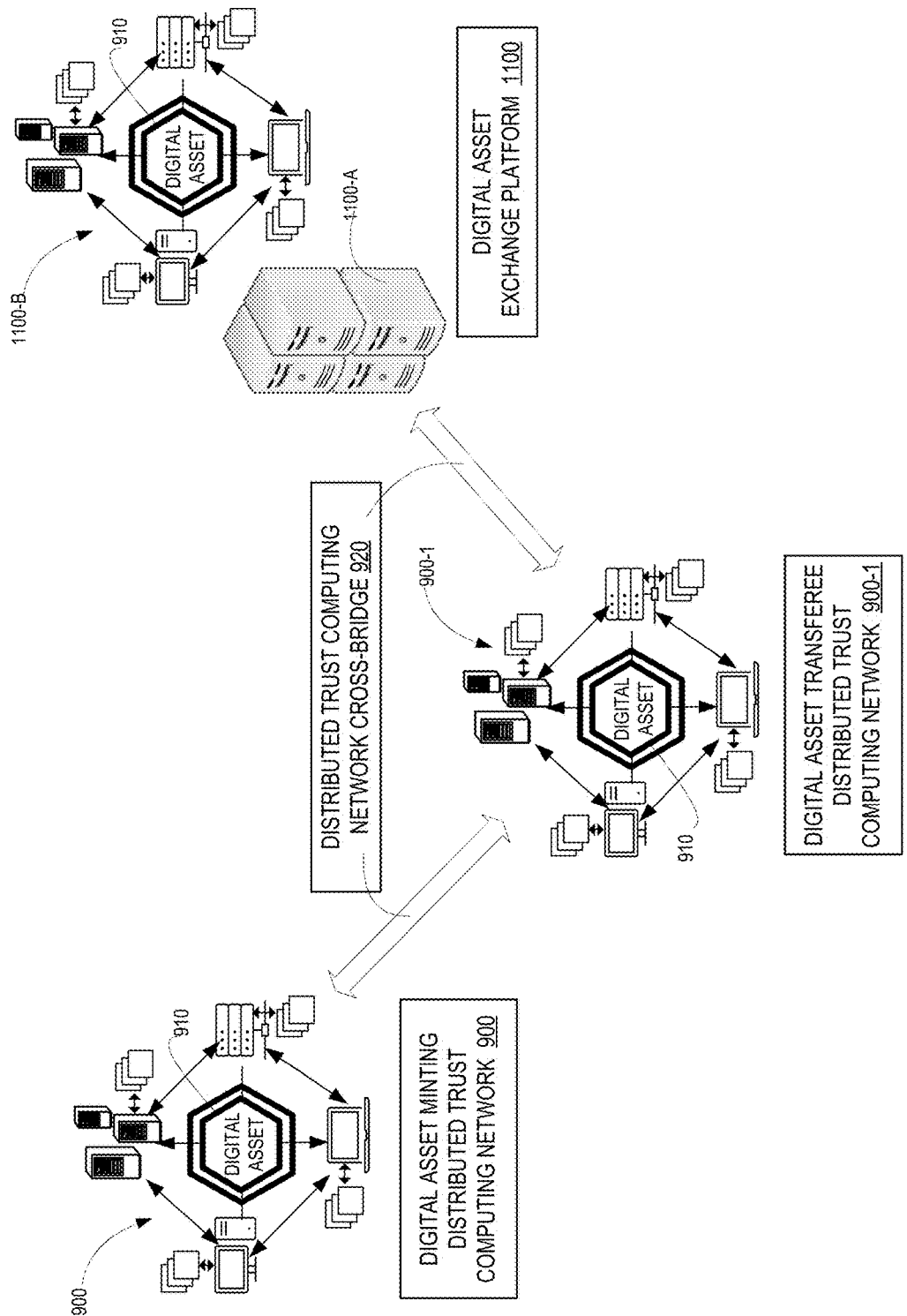
Figure 7:
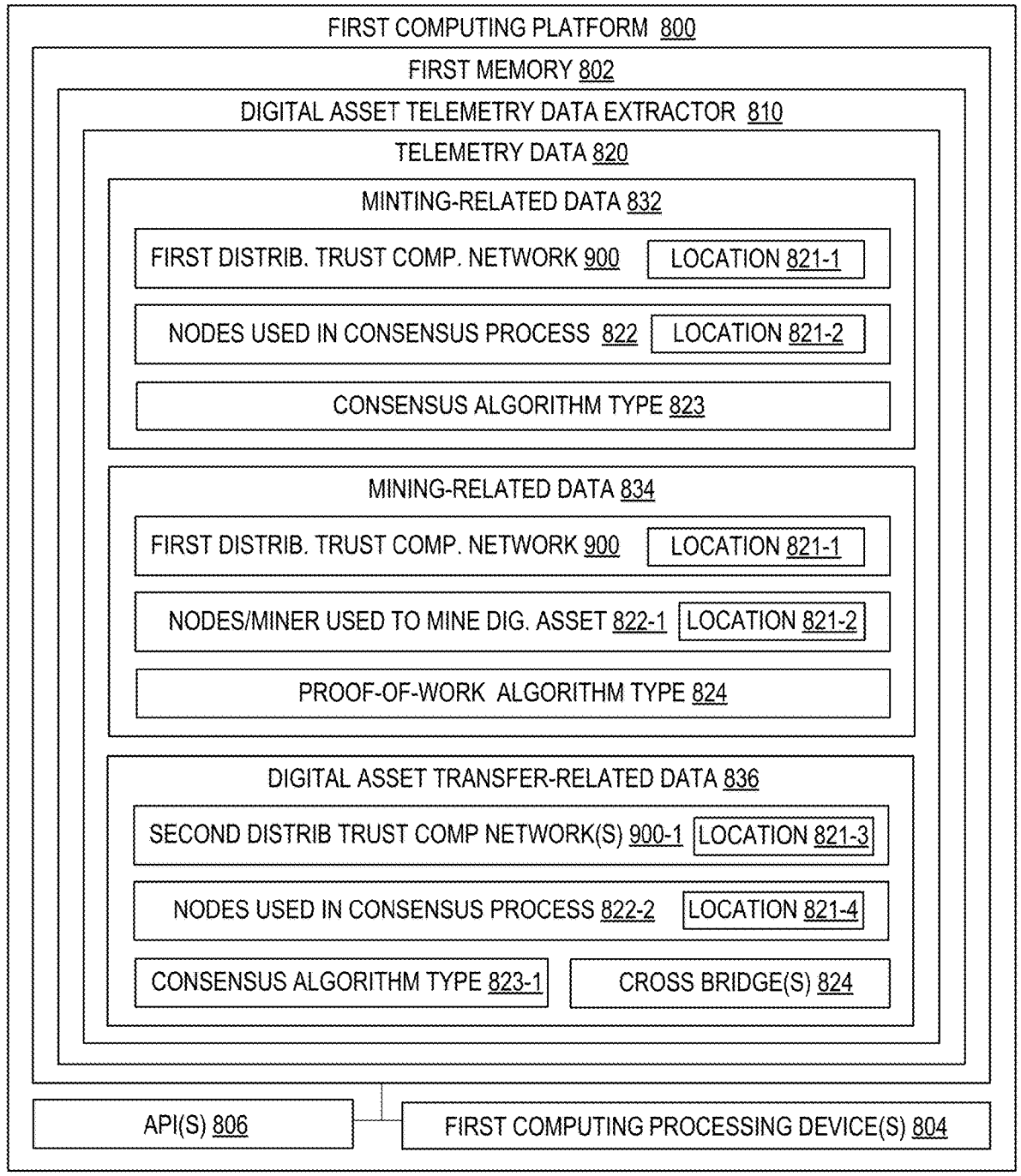
Figure 8:
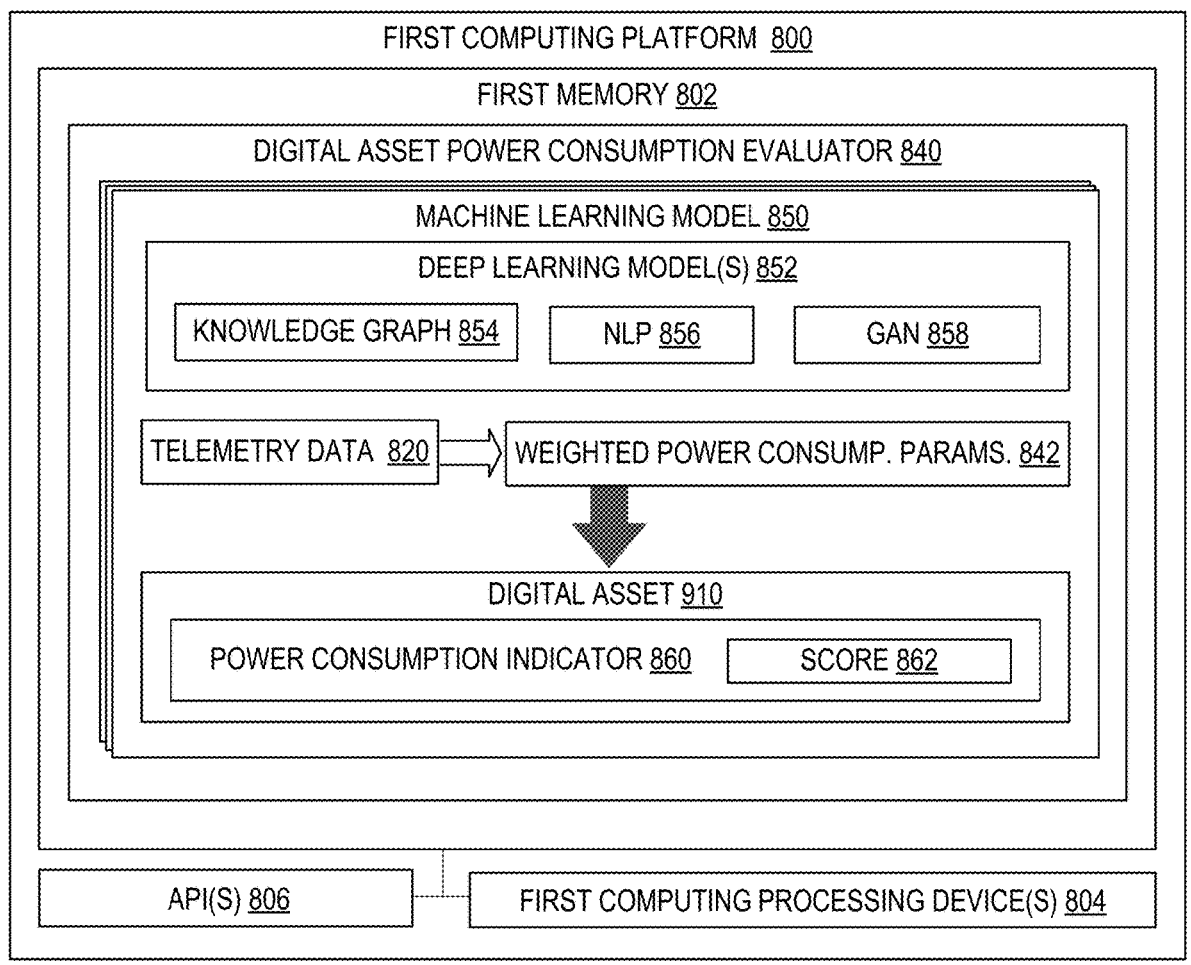
Figure 9:
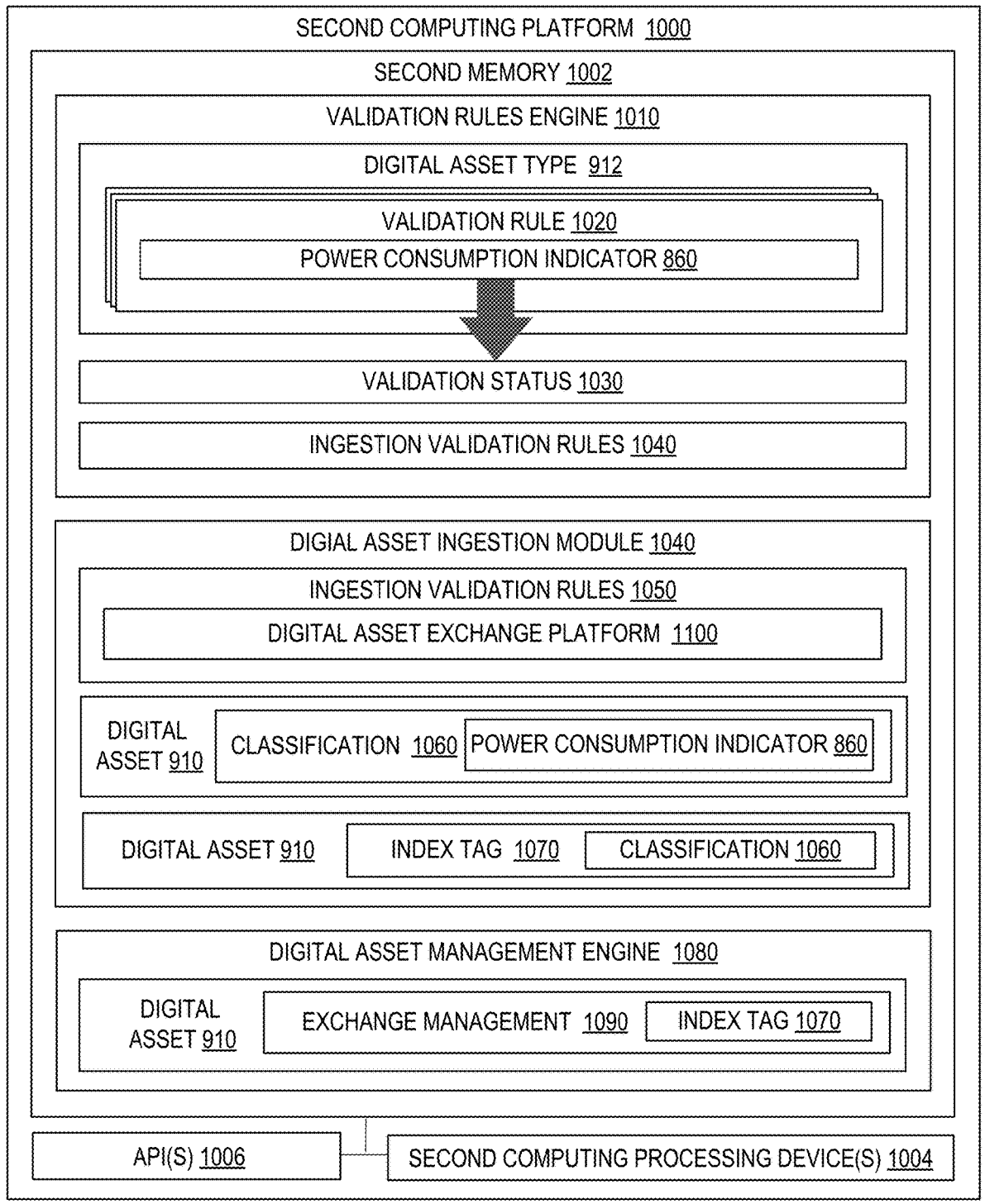
Figure 10:
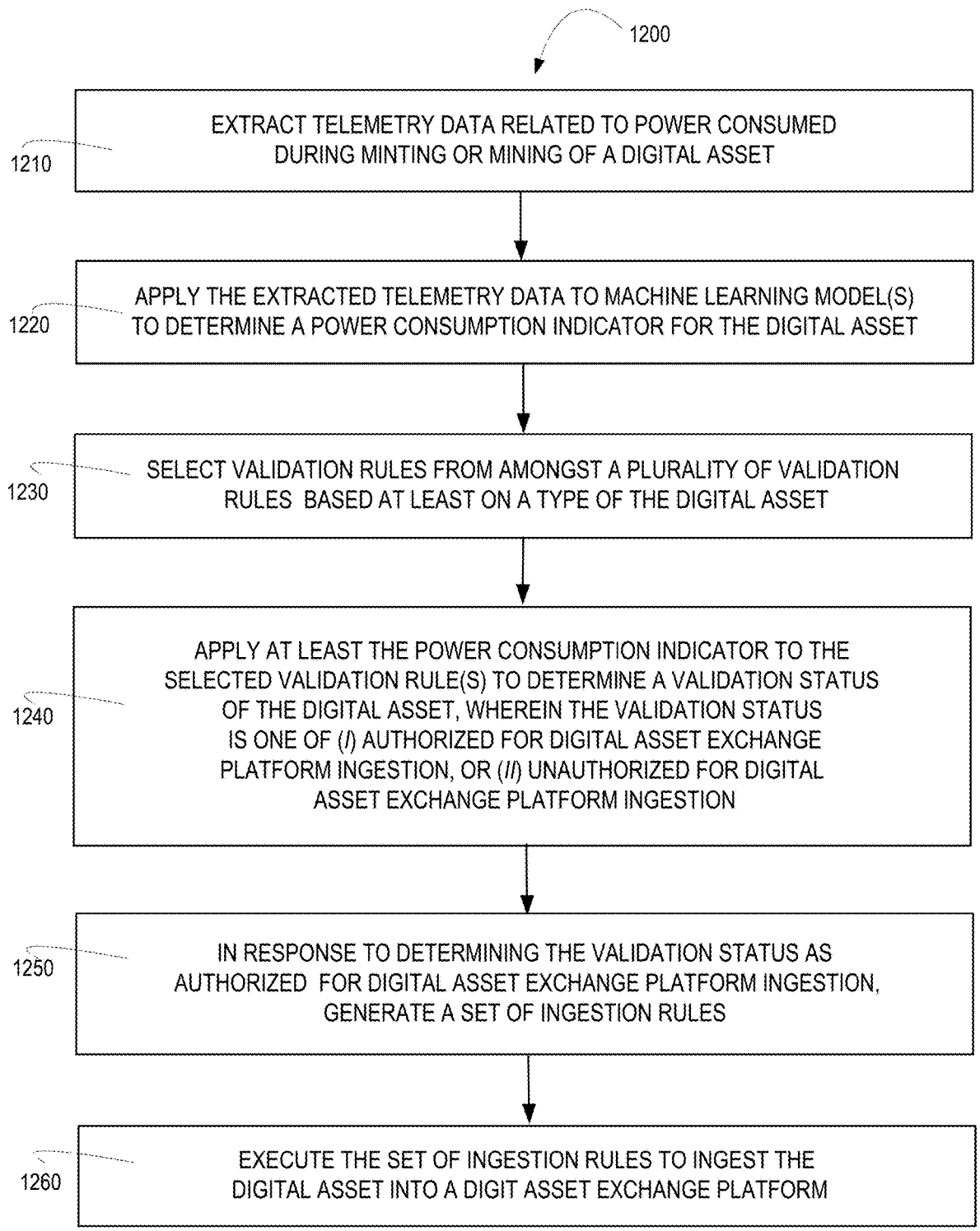

Having thus described embodiments of the disclosure in general terms, reference will now be made to the accompanying drawings, wherein:

FIG. 1 is a schematic/block diagram of a system for intelligent minting of digital assets with power consumption optimization, in accordance with embodiments of the present invention;

FIG. 2 is schematic/block diagram of an alternate system for intelligent minting of digital assets with power consumption optimization, in accordance with embodiments of the present invention;

FIG. 3 is a block diagram of a computing platform including a digital file metadata extractor and a digital asset power consumption optimization engine, in accordance with embodiments of the present invention;

FIG. 4 is a flow diagram of a method for intelligent minting of digital assets with power consumption optimization, in accordance with embodiments of the present invention;

FIG. 5 is a schematic/block diagram of a system for intelligent validation of digital assets through power consumption telemetry tracking, in accordance with embodiments of the present invention;

FIG. 6 is schematic/block diagram of a system for power consumption telemetry tracking including transfer of a digital asset amongst different distributed trust computing networks; in accordance with embodiments of the present invention;

FIG. 7 is a block diagram of a computing platform including a digital asset telemetry data extractor, in accordance with embodiments of the present invention;

FIG. 8 is a block diagram of a computing platform including digital asset power consumption evaluator, in accordance with embodiments of the present invention;

FIG. 9 is a block diagram of a computing platform including a validation rules engine, a digital asset ingestion module and a digital asset management engine, in accordance with embodiments of the present invention; and FIG. 10 is a flow diagram of a method for intelligent validation of digital assets through power consumption telemetry tracking, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that intelligently and, in some embodiments, dynamically optimize power consumption during minting of a digital asset, such as an NFT or the like. Metadata is extracted from a digital file and the extracted metadata is applied to Machine Learning (ML) models, such as Deep Learning (DL) models to determine an optimal power consumption scheme for minting the digital asset from the digital file. In response to determining the optimal power consumption, the digital asset is minted using the optimal power consumption scheme.

In specific embodiments of the invention, the optimal power consumption scheme defines (i) a distributed trust computing network for minting the digital asset (including the geographic location of the distributed trust computing network), (ii) a minting algorithm used to mint the digital asset, (iii) a consensus algorithm for validating minting of the digital asset, and (iv) a storage location for the digital file once the digital asset has been minted. In further specific embodiments of the invention, real-time network performance parameters are received from various different distributed trust computing networks and applied to the ML models for determining which distributed trust computing network is defined in the optimal power consumption scheme.

In further specific embodiments of the invention, once minted, certification rules are selected based on digital asset type and the optimal power consumption scheme (and/or results of the optimal power consumption scheme (i.e., the power consumed)) are applied to the selected certification rules to determine a certification status for the digital asset. The certification status indicates a level of power consumption used to mint the digital asset. In further related embodiments of the system, a set of ingestion validation rules, such as a smart contract is generated based on the certification status and the validation rules are executed to receive and validate the digital asset into a digit asset exchange platform.

Referring to FIG. 1, a schematic/block diagram is presented of a system 100 for minting digital assets, such as Non-Fungible Tokens (NFTs) with power consumption optimization (e.g., so-called "carbon footprint" optimization), in accordance with embodiments of the present invention. System 100 is implemented in a distributed communication network, which may comprise the Intranet, one or more internets, one or more cellular networks or the like. System 100 includes first computing platform 200, which includes first memory 202 and one or more first computing device processors 204 in communication with first memory 202. First memory 202 stores digital file metadata extractor 210 which is configured to extract metadata 220 from a digital file 120 that is being minted to form a digital asset 410, such as an NFT or the like.

First memory 202 additionally stores digital asset power consumption optimization engine 230 that includes one or more Machine-Learning (ML) models 240, which may, in some embodiments of the invention, be Deep-Learning (DL) models or the like. Digital asset power consumption optimization engine 230 is configured to apply, at least, the extracted metadata 220 to the machine learning model(s) 240 to determine an optimal power consumption scheme 250 for minting 320 the digital asset 410 from the digital file 120. The optimal power consumption may, in some instances, be the lowest possible power consumption, while, in other instances, other factors may be determinative of the optimal power consumption, such as geo-location of the distributed trust computing network 400 at which the digital asset 410 is minted.

System 700 additionally includes second computing platform 300, which includes second memory 302 and one or more second computing device processors 304 in communication with second memory 302. Second memory 302 stores digital asset minting application 310 that is executable by at least one of the second computing device processor(s) 304 and configured to receive the digital file 120 and mint 320 the digital asset 410 from the digital file 120 in accordance with the optimal power consumption scheme 250.

Referring to FIG. 2, a schematic/block diagram is presented of an alternative system 100-1 for minting and certifying digital assets, such as Non-Fungible Tokens (NFTs) with power consumption optimization, in accordance with embodiments of the present invention. In addition to the first and second computing platforms, shown and discussed in relation to FIG. 1, the alternative system 100-1 of FIG. 2 includes third computing platform 500, which includes third memory 502 and one or more third computing device processors 504 in communication with third memory 502. Third memory 502 stores certification rules engine 500 that is executable by at least one of the third computing processor device(s) 504 and configured to select one or more of the plurality certification rules 520 based at least on a type of the digital asset 410, and, in response to selecting the certification rules 520, apply at least the optimal power consumption scheme 250 to the selected certification rules 520 to a determine a certification status 530 for the digital asset 410. Certification status indicates a level of power consumption used to mint the digital asset 410 based on utilization of the optimal power consumption scheme 550 in minting 320 the digital asset 410.

In specific embodiments of the system 100-1, certification rules engine 510 is further configured to, in response to determining the certification status 530, generate a set of ingestion validate rules 540 (e.g., "smart contract"). In such embodiments of the system 600-1, third memory 502 may further store digital asset ingestion module 550 that is executable by one or more of the third computing processor device(s) 504 and configured to execute the set of ingestion rules 540 to receive and validate the digital asset 410 into a digit asset exchange platform 560.

Referring to FIG. 3, a block diagram is presented of first computing platform 200, in accordance with embodiments of the present invention. In addition to providing greater details of digital asset power consumption optimization engine 230, FIG. 9 highlights various alternate embodiments of the invention. First computing platform 200 may comprise one or multiple devices, such as application servers or the like. First computing platform 200 includes first memory 202, which may comprise volatile and/or non-volatile memory, such as read-only and/or random-access memory (RAM and ROM), EPROM, EEPROM, flash cards, or any memory common to computing platforms). Moreover, first memory 202 may comprise cloud storage, such as provided by a cloud storage service and/or a cloud connection service.

Further, first computing platform 200 includes one or more first computing processing devices 204, which may be an application-specific integrated circuit ("ASIC"), or other chipset, logic circuit, or other data processing device. First computing processing device(s) 204 may execute one or more application programming interface (APIs) 206 that interface with any resident programs, such as digital file metadata extractor 210 and digital asset power consumption optimization engine 230 or the like, stored in first memory 202 of first computing platform 200 and any external programs. First computing processing devices(s) 204 may include various processing subsystems (not shown in FIG. 9) embodied in hardware, firmware, software, and combinations thereof, that enable the functionality of first computing platform 200 and the operability of first computing platform 200 on a distributed communication network 110 (shown in FIG. 7), such as the Internet, intranet(s), cellular network(s) and the like. For example, processing subsystems allow for initiating and maintaining communications and exchanging data with other networked devices. For the disclosed aspects, processing subsystems of first computing platform 200 may include any subsystem used in conjunction with digital file metadata extractor 210 and digital asset power consumption optimization engine 230 and related tools, routines, sub-routines, algorithms, sub-algorithms, sub-modules thereof.

In specific embodiments of the present invention, first computing platform 200 additionally includes a communications module (not shown in FIG. 9) embodied in hardware, firmware, software, and combinations thereof, that enables electronic communications between components of first computing platform 200 and other networks and network devices. Thus, communication module may include the requisite hardware, firmware, software and/or combinations thereof for establishing and maintaining a network communication connection with one or more devices and/or networks.

As discussed in FIG. 1, first memory 202 of first computing platform 200 stores digital file metadata extractor 210 and digital asset power consumption optimization engine 230, which are executable by at least one of the one or more first computing processor devices 204. As previously discussed in relation to FIG. 1, digital file metadata extractor 210 is configured to extract metadata 220 from the digital file 120 that is being minted 320 into a digital asset 410. The metadata 220 may define digital characteristics of the digital file, which may be an image file, audio file, video file, entertainment file or the like.

In specific embodiments of the system 100, digital asset power consumption optimization engine 230 is configured to receive real-time (i.e., current) network performance parameters 260 from a plurality of different distributed trust computing networks 400 and apply both the metadata 220 and the network performance parameters 260 to the machine-learning models 240 to determine the optimal power consumption scheme 250.

In specific embodiments of the system 100, the optimal power consumption scheme 250 includes a geo-location 252 for minting the digital asset 410 and/or the distributed trust computing network 400 for minting the digital asset 410. Moreover, the optimal power consumption scheme 250 includes the minting algorithm(s) 254 and the consensus algorithm 256. In addition, in those instances in which the digital file 120 is stored in location other than the distributed trust computing network 400 at which minting occurred, the optimal power consumption scheme 250 includes the storage location 258, post-minting, of the digital file.

Referring to FIG. 4, a flow diagram is depicted of a method 600 for minting digital assets with power consumption optimization, in accordance with embodiments of the present invention. At Event 610 metadata is extracted from a digital file that is being minted into a digital asset, such as an NFT or the like. The metadata may include digital characteristics of the digital file, which may include an image file, an audio file, a video/multimedia file, an entertainment file or the like.

At Event 620, at least the extracted metadata is applied on machine-learning model(s) to determine an optimal power consumption scheme for minting the digital asset from the digital file. In specific embodiments of the method, current distributed trust computing network performance parameters from various different distributed trust computing networks are received and also applied to the machine learning models to determine the optimal power consumption scheme. The optimal power consumption scheme may define the geo-location for minting and/or the distributed trust computing network at which minting occurs, the minting algorithm(s), the consensus/validation algorithm(s) and the like. The optimal power consumption scheme may, in some instances, provide for the lowest possible power consumption, while, in other instances, other factors may be determinative of the optimal power consumption, such as geo-location of the distributed trust computing network at which the digital asset is minted.

At Event 630, the digital asset is minted from the digital file in accordance with the optimal power consumption scheme. In specific embodiments of the method, in which the digital file is not stored on the same distributed trust computing network at which the digital asset was minted, the digital file, post-minting, is filed at a storage location as defined by the optimal power consumption scheme.

Referring to FIG. 5, a schematic/block diagram is presented of a system 700 for intelligent validation of digital assets via power consumption telemetry tracking, in accordance with embodiments of the invention. The system 700 includes first computing platform 800, which may comprise one or more application servers or the like. First computing platform 800 includes first memory 802 and one or more first computing processing devices 804 in communication with first memory 802. First memory 802 stores digital asset telemetry data extractor 810 that is executable by at least one of the first computing device processor(s) 804. Digital asset telemetry data extractor 810 is configured to extract telemetry data 820 related to the power consumption 830, commonly referred to as "carbon footprint" of a digital asset 310 (e.g., Non-Fungible Token (NFT), cryptocurrency or the like) during, at least the minting 832 or mining 834 of the digital asset 310. In this regard, telemetry data 820 is extracted from, at least, the distributed trust computing network 300, commonly referred to a "blockchain network" at which the digital asset 310 is minted 832, mined 834 and/or stored.

First memory 802 additionally stores digital asset power consumption evaluation engine 840, which includes one or more machine-learning (ML) models 850. In specific embodiments of the invention, the machine-learning (ML) model(s) 850 are deep-learning (DL) models. Digital asset power consumption evaluation engine 840 is executable by at least one of the one or more first computing processor devices 804 and is configured to apply the extracted telemetry data 820 to the one or more machine learning models 850 to determine a power consumption indicator 860 for the digital asset 310. The power consumption indicator 860 indicates a level or amount of power consumed by the digital asset 310 during, at least, the minting 832/mining 834 of the digital asset 834 and, in some embodiments of the system, the entire lifecycle of the digital assets, including transfers of the digital asset 310 to other distributed trust computing networks 300, as described infra. in relation to FIG. 6.

The system 100 additionally includes second computing platform 1000, which may comprise one or more application servers or the like. Second computing platform 1000 includes second memory 1002 and one or more second computing processing devices 1004 in communication with second memory 1002. Second memory 1002 stores validation rules engine 1010 that is executable by at least one of the one or more second computing processor devices 1004. Validation rules engine 1010 includes a plurality of validation rules 1020 and is configured to select the appropriate validation rules 1020 from amongst the plurality of validation rules 1020 based, at least, on digital asset type 912. In response to validation rules 1020 selection, validation rules engine 1010 is configured to apply, at least, the power consumption indicator 860 to the selected one or more validation rules 1020 to determine a validation status 1030 for the digital asset 910. The validation status 1030 is one of (i) authorized for digital asset exchange platform 1100 ingestion, or (ii) unauthorized for digital asset exchange platform 1100 ingestion. In response to determining that the validation status 1030 is (i) authorized for digital asset exchange platform 1100 ingestion, validation rules engine 1010 is further configured to generate a set of ingestion validation rules 1040, commonly referred to a "smart contract".

Second memory 1002 additionally stores digital asset ingestion module 1050 that is executable by at least one of the one or more second computing processor devices 1004 and is configured to execute the set of ingestion rules 1040 (i.e., the "smart contract") to receive and validate the digital asset 910 into a digit asset exchange platform 1100. In specific embodiments of the system 100, digit asset exchange platform 1100 may be a financial institution platform or the like. As shown in FIG. 5, digit asset exchange platform 1100 may include applications servers 1100-A and distributed trust computing network 1100-B configured to store or provided access to digital asset 910. Application servers 1100-A and distributed trust computing network 1100-B are configured to work in unison to manage exchanges, such as transactions, involving the digital asset 910.

Referring to FIG. 6, a schematic diagram is depicted of transfer of a digital asset 910 amongst different distributed trust computing networks prior to ingestion of the digital asset into the digital asset exchange platform 1100. In such embodiments of the system 700, shown and described in FIG. 5, since the transfer to the digital asset 910 amongst different distributed trust computing networks consumes power, the telemetry data 820 extracted by the digital asset telemetry data extractor 810 includes telemetry data 820 associated with the transfer of the digital asset 910, including the distributed trust computing network cross-bridges 920 used as transfer mechanisms and the digital asset transferee distributed trust computing network 900-1 to which the digital asset is transferred. Transfer of the digital asset 910 from one distributed trust computing network 900 to another distributed trust computing network 900-1 may occur as a result of a digital asset exchange/transaction or may occur without an actual exchange/transaction. It should also be noted that while FIG. 6 only depicts one transfer of the digital asset 910, one of ordinary skill in the art will appreciate that the digital asset 910 may undergo multiple transfers to multiple different digital trust computing networks 900 prior to the digital asset 910 being ingested/transferred into the digital asset exchange platform 1100.

Referring to FIGS. 7 and 8, block diagrams are presented of first computing platform 800, in accordance with embodiments of the present invention. In addition to providing greater details of digital telemetry data extractor 810, FIG. 7 highlights various alternate embodiments of the invention. First computing platform 800 may comprise one or multiple devices, such as application servers or the like. First computing platform 800 includes first memory 802, which may comprise volatile and/or non-volatile memory, such as read-only and/or random-access memory (RAM and ROM), EPROM, EEPROM, flash cards, or any memory common to computing platforms). Moreover, first memory 802 may comprise cloud storage, such as provided by a cloud storage service and/or a cloud connection service.

Further, first computing platform 800 includes one or more first computing processing devices 804, which may be an application-specific integrated circuit ("ASIC"), or other chipset, logic circuit, or other data processing device. First computing processing device(s) 804 may execute one or more application programming interface (APIs) 806 that interface with any resident programs, such as digital asset telemetry data extractor 810, digital asset power consumption evaluation engine 840 or the like, stored in first memory 802 of first computing platform 800 and any external programs. First computing processing devices(s) 804 may include various processing subsystems (not shown in FIGS. 7 and 8) embodied in hardware, firmware, software, and combinations thereof, that enable the functionality of first computing platform 800 and the operability of first computing platform 800 on a distributed communication network 710 (shown in FIG. 5), such as the Internet, intranet(s), cellular network(s) and the like. For example, processing subsystems allow for initiating and maintaining communications and exchanging data with other networked devices. For the disclosed aspects, processing subsystems of first computing platform 800 may include any subsystem used in conjunction with digital asset telemetry data extractor 810 and digital asset power consumption evaluation engine 840 and related tools, routines, sub-routines, algorithms, sub-algorithms, sub-modules thereof.

In specific embodiments of the present invention, first computing platform 800 additionally includes a communications module (not shown in FIGS. 3 and 4) embodied in hardware, firmware, software, and combinations thereof, that enables electronic communications between components of first computing platform 800 and other networks and network devices. Thus, communication module may include the requisite hardware, firmware, software and/or combinations thereof for establishing and maintaining a network communication connection with one or more devices and/or networks.

As discussed in FIG. 1, first memory 802 of first computing platform 800 stores digital asset telemetry data extractor 810, which is executable by at least one of the one or more first computing processor devices 804. As previously discussed in relation to FIG. 1, digital asset telemetry data extractor 810 is configured to extract telemetry data 820 related to power consumption 830 (i.e., carbon footprint) occurring, at least during minting 832 or mining 834 of the digital asset 910. Minting 832-related telemetry data 820 may include, but is not limited to, the first distributed trust computing network 900 used to mint/validate the digital asset 910 and the geo-location 821-1 (e.g., country or regions within a country) of the first distributed trust computing network 900. Further, minting 832-related telemetry data 820 may include the nodes 822 used in the consensus/validation process, the geo-location 821-2 (e.g., country or regions within a country) of the nodes 822 and the consensus algorithm type 823 used in the consensus/validation process.

Mining 834-related telemetry data 820 may include, but is not limited to, the first distributed trust computing network 900 used to mine the digital asset 910 and the geo-location 821-1 (e.g., country or regions within a country) of the first distributed trust computing network 900. Further, mining 834-related telemetry data 820 may include the nodes 822-1 and/or miner used in mining and/or proof-of-work process, the geo-location 821-2 (e.g., country or regions within a country) of the nodes 822-1 and the proof-of-work (PoW) algorithm type 824 used in the proof of work/validation process.

In specific embodiments of the system, in which the digital asset has been transferred from one distributed trust computing network to another, telemetry data 820 includes digital asset transfer-related telemetry data 836. Digital asset transfer-related telemetry data 836 may include, but is not limited to, the second (i.e., transferee) distributed trust computing network 900-1 and the geo-location 821-3 (e.g., country or regions within a country) of the second distributed trust computing network 900-1. Further, digital asset transfer-related telemetry data 836 may include the nodes 822-2 used in the consensus/validation process, the geo-location 821-4 (e.g., country or regions within a country) of the nodes 822-2, the consensus/validation algorithm type 823-1 used in the consensus/validation process and the cross-bridges(s) 826 used as the transfer mechanism.

In addition to providing greater details of digital asset power consumption evaluator 840, FIG. 8 highlights various alternate embodiments of the invention. As discussed in FIG. 1, first memory 802 of first computing platform 800 stores digital asset power consumption evaluator 840, which is executable by at least one of the one or more first computing processor devices 804. Digital asset power consumption evaluator 840 includes one or more machine-learning (ML) models 850. In specific embodiments of the invention, the machine-learning (ML) model(s) 850 are deep-learning (DL) models 852, such as, but not limited to, knowledge graph 854, Natural Language Processing (NLP) 856, Generative Adversarial Network (GAN) 858 or the like. Digital asset power consumption evaluation engine 840 is executable by at least one of the one or more first computing processor devices 804 and is configured to apply the extracted telemetry data 820 to the one or more machine learning models 850 to determine a power consumption indicator 860 for the digital asset 910. In specific embodiments of the system, telemetry data 820 is mapped to weighted power consumption parameters 842 which result in the power consumption indicator 860. Specifically, weighted power consumption parameters 842 are summed to result in a power consumption score 862 that indicates the level of power consumed by the digital asset 910 during minting/mining, storage and, where applicable, transfer of the digital asset 910.

Referring to FIG. 9, a block diagram is presented of second computing platform 1000, in accordance with embodiments of the present invention. In addition to providing greater details of validation rules engine 1010 and digital asset ingestion module 1050, FIG. 5 highlights various alternate embodiments of the invention. Second computing platform 1000 may comprise one or multiple devices, such as application servers or the like. Second computing platform 1000 includes second memory 1002, which may comprise volatile and/or non-volatile memory, such as read-only and/or random-access memory (RAM and ROM), EPROM, EEPROM, flash cards, or any memory common to computing platforms). Moreover, second memory 1002 may comprise cloud storage, such as provided by a cloud storage service and/or a cloud connection service.

Further, second computing platform 1000 includes one or more second computing processing devices 1004, which may be an application-specific integrated circuit ("ASIC"), or other chipset, logic circuit, or other data processing device. Second computing processing device(s) 1004 may execute one or more application programming interface (APIs) 1006 that interface with any resident programs, such as validation rules engine 1010, digital asset ingestion module 1050, digital asset management engine 1080 or the like, stored in second memory 1002 of second computing platform 1000 and any external programs. Second computing processing devices(s) 1004 may include various processing subsystems (not shown in FIG. 9) embodied in hardware, firmware, software, and combinations thereof, that enable the functionality of second computing platform 1000 and the operability of second computing platform 1000 on a distributed communication network 710 (shown in FIG. 5), such as the Internet, intranet(s), cellular network(s) and the like. For example, processing subsystems allow for initiating and maintaining communications and exchanging data with other networked devices. For the disclosed aspects, processing subsystems of second computing platform 1000 may include any subsystem used in conjunction with validation rules engine 1010, digital asset ingestion module 1050, digital asset management engine 1080 and related tools, routines, sub-routines, algorithms, sub-algorithms, sub-modules thereof.

In specific embodiments of the present invention, second computing platform 1000 additionally includes a communications module (not shown in FIG. 9) embodied in hardware, firmware, software, and combinations thereof, that enables electronic communications between components of second computing platform 1000 and other networks and network devices. Thus, communication module may include the requisite hardware, firmware, software and/or combinations thereof for establishing and maintaining a network communication connection with one or more devices and/or networks.

As discussed in relation to FIG. 5, second memory 1002 stores validation rules engine 1010 that is configured to includes a plurality of validation rules 1020 and is configured to select the appropriate validation rules 1020 from amongst the plurality of validation rules 1020 based, at least, on digital asset type 912. In response to validation rules 1020 selection, validation rules engine 1010 is configured to apply, at least, the power consumption indicator 860 to the selected one or more validation rules 1020 to determine a validation status 1030 for the digital asset 910. The validation status 1030 is one of (i) authorized for digital asset exchange platform 1100 ingestion, or (ii) unauthorized for digital asset exchange platform 1100 ingestion. In specific embodiments of the system, geo-locations of distributed trust computing network(s) and/or nodes of the distributed trust computing network(s) are also applied to the selected validation rules 1020 to determine validation status 1030. In one such example, the selected validation rules 1020 may grant a validation status of (ii) unauthorized for digital asset exchange platform 1100 ingestion, if the distributed trust computing network is located in a specific country or region or, in another example, the selected validation rules 1020 may allow validation status (i) authorized for digital asset exchange platform 1100 ingestion, if the power consumption indicator indicates a high level of power consumption but the distributed trust computing network is located in a specific preferred country or region that uses a high amount of non-fossil fuel energy. In response to determining that the validation status 1030 is (i) authorized for digital asset exchange platform 1100 ingestion, validation rules engine 1010 is further configured to generate a set of ingestion validation rules 1040, commonly referred to a "smart contract".

Second memory 1002 additionally stores digital asset ingestion module 1050 that is executable by at least one of the one or more second computing processor devices 1004 and is configured to execute the set of ingestion rules 1040 (i.e., the "smart contract") to receive and validate the digital asset 910 into a digit asset exchange platform 1100. In specific embodiments of the system 700, digit asset exchange platform 1100 may be a financial institution platform or the like. In specific embodiments of the system, digital asset ingestion module 1050 is further configured to assign a one of a plurality of classifications 1060 to the digital asset based on the power consumption indicator and, in other specific embodiments provide an index tag 1070 to the digital asset 910 based on the assigned classification 1060. The index tag 1070 being "attached" to the digital asset 910 will remain with the digital asset in the event the digital asset 910 undergoes an exchange/transaction or is transferred to another digital trust computing network.

In other embodiments of the system, second memory 1002 additionally stores digital asset management engine 1080 which is executable by at least one of the one or more second computing processor devices 1004 and configured to perform exchange/transaction management 1090 of the digital asset 910 in accordance with an index tag 1070. In this regard, digital asset management engine 1080 is executed once a digital asset 910 has been validated and ingested into the digital asset exchange platform 1100. Moreover, exchange/transaction management 1090 means that subsequent exchanges/transactions involving the digital asset 910 may be authorized or denied based on the index tag 1070 (i.e., classification 1060 assigned to the digital asset 910).

Referring to FIG. 10, a flow diagram is presented of method 1200 for intelligent validation of digital assets via power consumption telemetry data tracking, in accordance with embodiments of the present invention. At Event 1210, telemetry data is extracted from a digital asset or distributed trust computing network used to mint/mine and/or store the digital asset. The telemetry data is related to power consumption (i.e., the carbon footprint of the digital asset) of the digital asset occurred in minting/mining of the digital asset, storage of the asset and, in some embodiments, where applicable transfer of the digital asset amongst different distributed trust computing networks.

At Event 1220, the extracted telemetry data is applied to ML algorithms, in specific embodiments, DL algorithms to determine a power consumption indicator for the digital asset. The power consumption indicator, which may be a numeric score or the like indicates the level of power consumed by the digital asset when minting/mining, storing, and transferring the digital asset.

In response to determining the power consumption indicator, at Event 1230, validation rules are selected from amongst a plurality of validation rules based, at least, on the type of digital asset and, at Event 1240, at least the power consumption indicator (and, in some embodiments of the invention geo-location of distributed trust computing networks and/or nodes) are applied to the validation rules to determine a validation status. The validation may include (i) authorized for digital asset exchange platform ingestion, or (ii) unauthorized for digital asset exchange platform ingestion.

In response to determining that the validation status is (i) authorized for digital asset exchange platform ingestion, at Event 1250, a set of ingestion rules (i.e., a "smart contract") is generated and, at Event 1260, the ingestion rules are executed to ingest the digital asset into a digital asset exchange platform, such as a financial institution's NFT or cryptocurrency transaction platform.

Thus, present embodiments of the invention discussed in detail above, provide for intelligently and, in some embodiments, dynamically optimizing power consumption during minting of a digital asset, such as an NFT or the like. Metadata is extracted from a digital file and the extracted metadata is applied to Machine Learning (ML) models, such as Deep Learning (DL) models to determine an optimal power consumption scheme for minting the digital asset from the digital file. In response to determining the optimal power consumption, the digital asset is minted using the optimal power consumption scheme. As a result of the present invention, the digital asset is minted using optimal power consumption to minimize the digital assets carbon footprint.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for intelligently determining and implementing power consumption optimization for minting digital assets, the system comprising:
    a first computing platform including a first memory and one or more first computing processor devices in communication with the first memory, wherein the first memory stores:
        a digital file metadata extractor executable by at least one of the one or more first computing processor devices and configured to:
            extract metadata from a digital file, and
        a digital asset power consumption optimization engine including one or more first machine learning models, executable by at least one of the one or more first computing processor devices and configured to:
            apply, at least, the extracted metadata to the one or more first machine learning models to determine an optimal power consumption scheme for minting a digital asset of the digital file; and
    a second computing platform including a second memory and one or more second computing processor devices in communication with the second memory, wherein the second memory stores a digital asset minting application, executable by at least one of the one or more second computing processor devices and configured to:
        receive the digital file, and
        mint a digital asset of the digital file according to the optimal power consumption scheme.

2. The system of claim 1, wherein the digital asset power consumption optimization engine is further configured to apply, at least, the extracted metadata to the one or more machine learning models to determine an optimal power consumption scheme, wherein the optimal power consumption scheme includes at least one of (i) a distributed trust computing network for minting the digital asset, (ii) a minting algorithm used to mint the digital asset, (iii) a consensus algorithm for validating minting of the digital asset.

3. The system of claim 1, wherein the digital asset power consumption optimization engine is further configured to receive real-time network performance parameters from a plurality of distributed trust computing networks and further apply the real-time network performance parameters to the one or more machine learning models to determine the optimal power consumption scheme including the distributed trust computing network for minting the digital asset from amongst the plurality of distributed trust computing networks.

4. The system of claim 1, wherein the digital asset power consumption optimization engine is further configured to apply, at least, the extracted metadata to the one or more machine learning models to determine an optimal power consumption scheme, wherein the optimal power consumption scheme includes a geographic location for minting the digital asset.

5. The system of claim 1, wherein the digital asset power consumption optimization engine is further configured to apply, at least, the extracted metadata to the one or more machine learning models to determine an optimal power consumption scheme, wherein the optimal power consumption scheme includes a storage location for the digital file after minting the digital asset.

6. The system of claim 1, further comprising a third computing platform including a third memory and one or more third computing processor devices in communication with the third memory, wherein the third memory stores:
    a certification rules engine including a plurality of certification rules, executable by at least one of the one or more second computing processor devices and configured to:
        select one or more of the plurality certification rules based at least on a type of the digital asset, and
        apply at least the optimal power consumption scheme to the selected one or more certification rules to determine a certification status for the digital asset, wherein the certification status indicates a level of power consumption used to mint the digital asset.

7. The system of claim 6, wherein the certification rules engine is further configured to in response to determining the certification status, generate a set of ingestion validate rules.

8. The system of claim 7, wherein the third memory further stores a digital asset ingestion module executable by at least one of the one or more second computing processor devices and configured to execute the set of ingestion rules to receive and validate the digital asset into a digit asset exchange platform.

9. The system of claim 8, wherein the digital asset ingestion module is further configured to, in response to ingesting the digital asset into a digit asset exchange platform, classify the digital asset based on the certification status and assign an index tag based on the classification.

10. A computer-implemented method for intelligently determining and implementing power consumption optimization for minting digital assets, the method being executable by one or more computing device processors and comprising:
    extracting metadata from a digital file;
    applying, at least, the extracted metadata to one or more first machine learning models to determine an optimal power consumption scheme for minting a digital asset of the digital file; and
    minting a digital asset of the digital file according to the optimal power consumption scheme.

11. The computer-implemented method of claim 10, wherein applying further comprises applying, at least, the extracted metadata to the one or more first machine learning models to determine the optimal power consumption scheme, wherein the optimal power consumption scheme includes at least one of (i) a distributed trust computing network for minting the digital asset, (ii) a minting algorithm used to mint the digital asset, (iii) a consensus algorithm for validating minting of the digital asset.

12. The computer-implemented method of claim 10, further comprising receiving real-time network performance parameters from a plurality of distributed trust computing networks, and
    wherein applying further comprises applying the real-time network performance parameters to the one or more machine learning models to determine the optimal power consumption scheme including the distributed trust computing network for minting the digital asset from amongst the plurality of distributed trust computing networks.

13. The computer-implemented method of claim 10, wherein applying further comprises applying, at least, the extracted metadata to the one or more first machine learning models to determine the optimal power consumption scheme, wherein the optimal power consumption scheme includes at least one of (i) a geographic location for minting the digital asset and (ii) a storage location for the digital file after minting the digital asset.

14. The computer-implemented method of claim 10, further comprising:
selecting one or more of the plurality certification rules based at least on a type of the digital asset; and
applying at least the optimal power consumption scheme to the selected one or more certification rules to determine a certification status for the digital asset, wherein the certification status indicates a level of power consumption used to mint the digital asset.

15. The computer-implemented method of claim 14, further comprising:
in response to determining the certification status, generating a set of ingestion validate rules; and
executing the set of ingestion rules to receive and validate the digital asset into a digit asset exchange platform.

16. A computer program product comprising:
a non-transitory computer-readable medium comprising sets of codes for causing one or more computing devices to:
extract metadata from a digital file;
apply, at least, the extracted metadata to the one or more first machine learning models to determine an optimal power consumption scheme for minting a digital asset of the digital file; and
mint a digital asset of the digital file according to the optimal power consumption scheme.

17. The computer program product of claim 16, wherein the set of codes for causing the one or more computing devices to apply are further configured to cause the one or more computing devices to apply, at least, the extracted metadata to the one or more first machine learning models to determine the optimal power consumption scheme, wherein the optimal power consumption scheme includes at least one of (i) a distributed trust computing network for minting the digital asset, (ii) a minting algorithm used to mint the digital asset, (iii) a consensus algorithm for validating minting of the digital asset.

18. The computer program product of claim 16, wherein the set of codes further comprise a set of codes for causing the one or more computing devices to receive real-time network performance parameters from a plurality of distributed trust computing networks, and
wherein the set of codes for causing the one or more computing devices to apply are further configured to cause the one or more computing devices to apply the real-time network performance parameters to the one or more machine learning models to determine the optimal power consumption scheme including the distributed trust computing network for minting the digital asset from amongst the plurality of distributed trust computing networks.

19. The computer program product of claim 16, wherein the set of codes for causing the one or more computing devices to apply are further configured to cause the one or more computing devices to apply, at least, the extracted metadata to the one or more first machine learning models to determine the optimal power consumption scheme, wherein the optimal power consumption scheme includes at least one of (i) a geographic location for minting the digital asset and (ii) a storage location for the digital file after minting the digital asset.

20. The computer program product of claim 16, wherein the sets of codes further comprise sets of codes for causing the one or more computing devices to:
select one or more of the plurality certification rules based at least on a type of the digital asset; and
apply at least the optimal power consumption scheme to the selected one or more certification rules to determine a certification status for the digital asset, wherein the certification status indicates a level of power consumption used to mint the digital asset.

\* \* \* \* \*